United States Patent
Williams (10) Patent No.: US 8,400,452 B2
(45) Date of Patent: Mar. 19, 2013

(54) METHOD AND SYSTEM FOR SEGMENTED PROPAGATION VISUALIZATION

(75) Inventor: Steven J. Williams, Austin, TX (US)

(73) Assignee: Motorola Solutions, Inc., Schaumburg, IL (US)

( * ) Notice: Subject to any disclaimer, the term of this patent is extended or adjusted under 35 U.S.C. 154(b) by 1350 days.

(21) Appl. No.: 12/117,081

(22) Filed: May 8, 2008

(65) Prior Publication Data

US 2009/0278849 A1   Nov. 12, 2009

(51) Int. Cl.
G06T 11/20   (2006.01)
(52) U.S. Cl. .................. 345/440; 345/619; 715/734
(58) Field of Classification Search .................. None
See application file for complete search history.

(56) References Cited

U.S. PATENT DOCUMENTS

| | | | | |
|---|---|---|---|---|
| 4,369,509 A * | 1/1983 | Akagiri | ................ | 369/174 |
| 5,138,327 A * | 8/1992 | Chang et al. | ................ | 342/367 |
| 5,801,862 A * | 9/1998 | Desurvire et al. | ................ | 398/80 |
| 7,127,734 B1 * | 10/2006 | Amit | ................ | 725/80 |
| 7,486,668 B2 * | 2/2009 | Reichbauer | ................ | 370/385 |
| 7,538,759 B2 * | 5/2009 | Newton | ................ | 345/173 |
| 7,689,918 B2 * | 3/2010 | Sauvageau | ................ | 715/736 |
| 7,889,666 B1 * | 2/2011 | Pei et al. | ................ | 370/242 |
| 2002/0035698 A1 * | 3/2002 | Malan et al. | ................ | 713/201 |
| 2002/0093932 A1 * | 7/2002 | Lomp et al. | ................ | 370/342 |
| 2003/0164789 A1 * | 9/2003 | Taylor et al. | ................ | 342/22 |
| 2004/0172467 A1 * | 9/2004 | Wechter et al. | ................ | 709/224 |
| 2004/0172470 A1 * | 9/2004 | Shiina | ................ | 709/224 |
| 2005/0040809 A1 * | 2/2005 | Uber et al. | ................ | 324/117 R |
| 2005/0248423 A1 * | 11/2005 | Qian et al. | ................ | 333/262 |
| 2006/0056328 A1 * | 3/2006 | Lehane et al. | ................ | 370/315 |
| 2006/0070113 A1 * | 3/2006 | Bhagwat et al. | ................ | 726/2 |
| 2006/0233137 A1 * | 10/2006 | Dantu et al. | ................ | 370/331 |
| 2007/0010207 A1 * | 1/2007 | Dooley | ................ | 455/67.11 |
| 2007/0233840 A1 * | 10/2007 | Alstrup et al. | ................ | 709/223 |
| 2008/0049650 A1 * | 2/2008 | Coppage et al. | ................ | 370/310 |
| 2008/0130495 A1 * | 6/2008 | Dos Remedios et al. | ................ | 370/230 |
| 2008/0159289 A1 * | 7/2008 | Narayanan et al. | ................ | 370/392 |
| 2008/0201112 A1 * | 8/2008 | Bouchard et al. | ................ | 703/1 |
| 2011/0032879 A1 * | 2/2011 | Beaudin et al. | ................ | 370/328 |
| 2011/0037610 A1 * | 2/2011 | Andres et al. | ................ | 340/825.49 |
| 2011/0264752 A1 * | 10/2011 | Lee et al. | ................ | 709/206 |

* cited by examiner

*Primary Examiner* — James A Thompson
*Assistant Examiner* — David H Chu
(74) *Attorney, Agent, or Firm* — Barbara R. Doutre (57) ABSTRACT

A method and system for visualizing the propagation of a radio-frequency (RF) signal between a first wireless device and a second wireless device is provided. The method includes segmenting (304) the RF signal along its propagation path, based on the one or more characteristics associated with the propagation of the RF signal. The method also includes visualizing (306) the segments by using graphical representations.

18 Claims, 7 Drawing Sheets

METHOD AND SYSTEM FOR SEGMENTED PROPAGATION VISUALIZATION

FIELD OF THE INVENTION

The present invention pertains to the propagation of a radio frequency (RF) signal, and more particularly, to visualizing the propagation of the RF signal between wireless devices.

BACKGROUND

The objective of a radio service is to relay information between two locations by propagating a radio frequency (RF) signal. The RF signal is propagated between two locations by using wireless devices. Each of the wireless devices includes at least one transmitter for transmitting the RF signal and at least one receiver for receiving the RF signal. A link is established between the wireless devices to propagate the RF signal. To set up the link, these wireless devices have a transmitting antenna, a propagation medium (free space or the earth's atmosphere), and a receiving antenna. Once a link is established between two wireless devices, the RF signal propagates from the transmitting antenna to the receiving antenna by utilizing the propagation medium.

Various mathematical or propagation models can predict the propagation of the RF signal. These mathematical or propagation models are also known as Propagation Models, Radio Wave Propagation Models, or Radio Propagation Models. They are based on an empirical mathematical formulation of the characterization of RF signal propagation as a function of their frequency, distance and other conditions. A propagation model is usually developed to predict the behavior of the propagation of an RF signal between wireless devices. Each model is designed, keeping in mind certain constraints, with the objective of predicting the way the RF signal propagates from one location to another.

RF propagation models are being used with different RF propagation simulation tools to visualize the propagation of an RF signal. The RF propagation simulation tools available visualize the RF signal to represent the characteristics associated with the RF signal received at the receiver of the wireless device. These tools use a single graphical representation to represent the final characteristic associated with the propagation path of the RF signal. For example, even if the characteristic associated with the RF signal is changed after traveling half of the propagation path, the complete RF signal is still represented by a single graphical representation, for example, a colored line or a line type. The graphical representation depicts the characteristic associated with the propagation of the RF signal when it is received at the receiver of the wireless device. Such tools are used to represent the overall strength of the RF signal received at the receiver of the wireless device. Further, the tools require manual intervention to move a pointing device between the transmitter and the receiver, to know the location of any change in the RF signal.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate the embodiments and explain various principles and advantages, in accordance with the present invention.

Skilled artisans will appreciate that elements in the figures are illustrated for simplicity and clarity and have not necessarily been drawn to scale. For example, the dimensions of some of the elements in the figures may be exaggerated, relative to other elements, to help in improving an understanding of the embodiments of the present invention.

DETAILED DESCRIPTION

Before describing in detail the embodiments that are in accordance with the present invention, it should be observed that these embodiments reside primarily in combinations of method steps and apparatus components related to visualizing the propagation of a radio-frequency (RF) signal between a first wireless device and a second wireless device. Accordingly, the apparatus components and method steps have been represented, where appropriate, by conventional symbols in the drawings, showing only those specific details that are pertinent for an understanding of the embodiments of the present invention, so as not to obscure the disclosure with details that will be readily apparent to those with ordinary skill in the art, having the benefit of the description herein.

In this document, relational terms such as first and second, top and bottom, and the like, may be used solely to distinguish one entity or action from another entity or action, without necessarily requiring or implying any actual relationship or order between such entities or actions. The terms 'comprises,' 'comprising,' or any other variation thereof, are intended to cover a non-exclusive inclusion, such that a process, method, article or apparatus that comprises a list of elements does not include only those elements but may include other elements not expressly listed or inherent in such a process, method, article or apparatus. An element proceeded by 'comprises . . . a' does not, without more constraints, preclude the existence of additional identical elements in the process, method, article or apparatus that comprises the element.

For an embodiment, a method for visualizing the propagation of an RF signal between a first wireless device and a second wireless device is provided. The method includes segmenting the RF signal along its propagation path, based on the one or more characteristics associated with the propagation of the RF signal. Further, the method includes visualizing the segments by using graphical representations.

For another embodiment, a method for visualizing the propagation of an RF signal between a first wireless device and a second wireless device is provided. The method includes segmenting the visualization of a mathematical model path of the RF signal when the RF signal is being transmitted from the second wireless device to the first wireless device. The method also includes visualizing the segments by using graphical representations.

For yet another embodiment, a system for visualizing the propagation of an RF signal between a first wireless device and a second wireless device is provided. The system includes a controller that is configured to segment the RF signal along its propagation path, based on the one or more characteristics associated with the propagation of the RF signal. The system also includes a display device that is configured to display the segments by using graphical representations.

Figure 1:
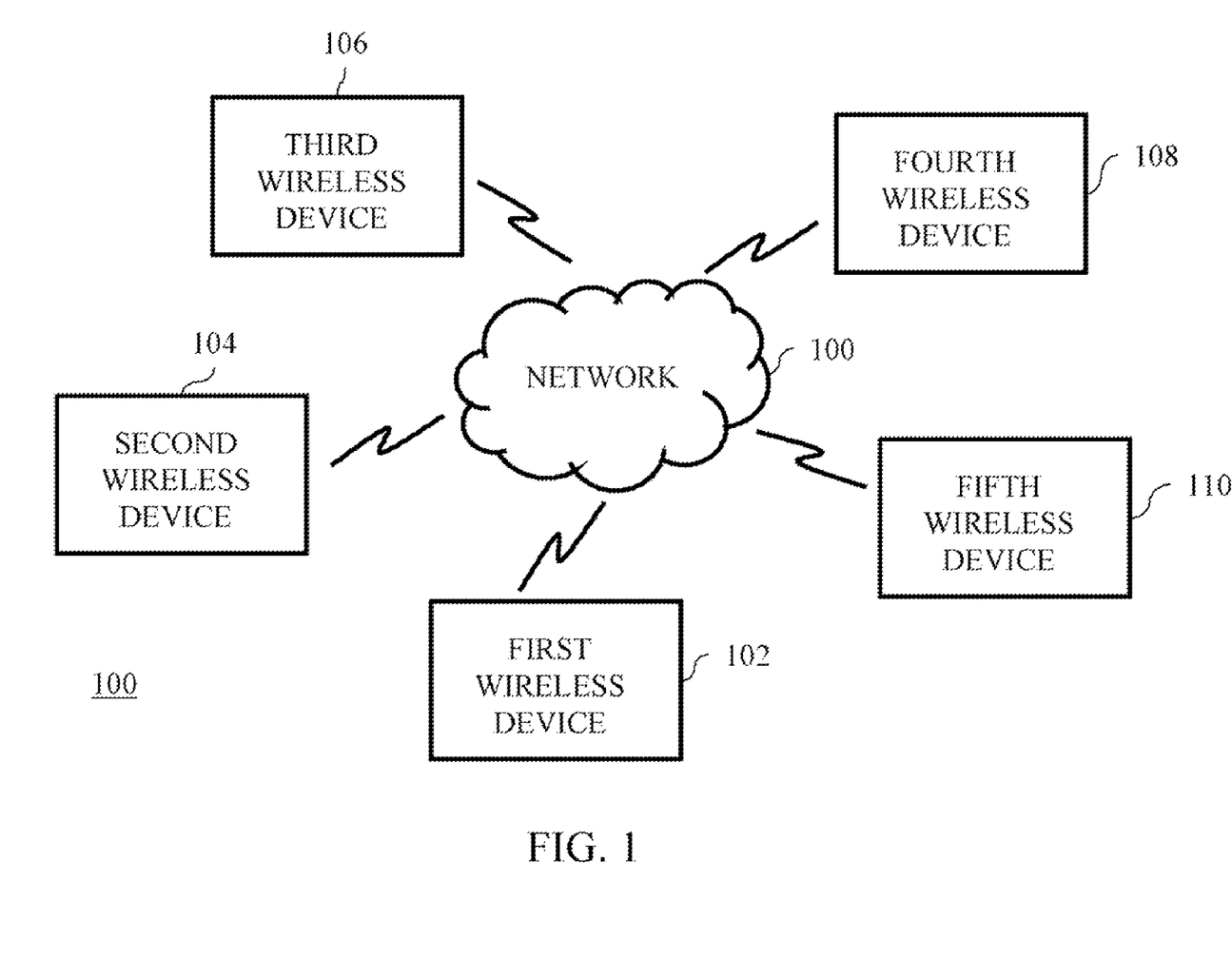
FIG. 1 illustrates an RF signal propagation environment, where various embodiments of the present invention can be practiced.

FIG. 1 illustrates a communication network 100 where various embodiments of the present invention can be practiced. The communication network 100 enables a plurality of wireless devices 102-110 to communicate with each other. The communication network 100 can include a wireless network such as a Wi-Fi network, a Wi-MAX network, a Global System for Mobile (GSM) communication network, a Code Division Multiple Access (CDMA) network, and so forth. The communication network 100 includes the plurality of wireless devices 102-110 propagating an RF signal. The propagation of the RF signal enables the exchange of information between two wireless devices located at different locations. The plurality of wireless devices includes a first wireless device 102, a second wireless device 104, a third wireless device 106, a fourth wireless device 108, and a fifth wireless device 110. The wireless devices have the same functionalities. For example, each wireless device can transmit and receive the RF signal. The link between the wireless devices includes a transmitting antenna, a propagation medium (free space or the earth's atmosphere), and a receiving antenna. The RF signal is transmitted from the transmitting antenna to the receiving antenna by utilizing the propagation medium present between the wireless devices. Examples of such wireless devices can include, but are not limited to, transmitters, radio transmitters, receivers, wireless access points, radio receivers, super-heterodyne receivers, and low-IF receivers. For clarity in describing the present invention, we will use the term 'plurality of wireless devices' while referring to more than one wireless device in general, and to specific wireless devices wherever required. Although only the wireless devices 102, 104, 106, 108 and 110 have been shown in FIG. 1, it will be apparent to a person ordinarily skilled in the art that the communication network 100 can include a greater or fewer number of devices.

Figure 2:
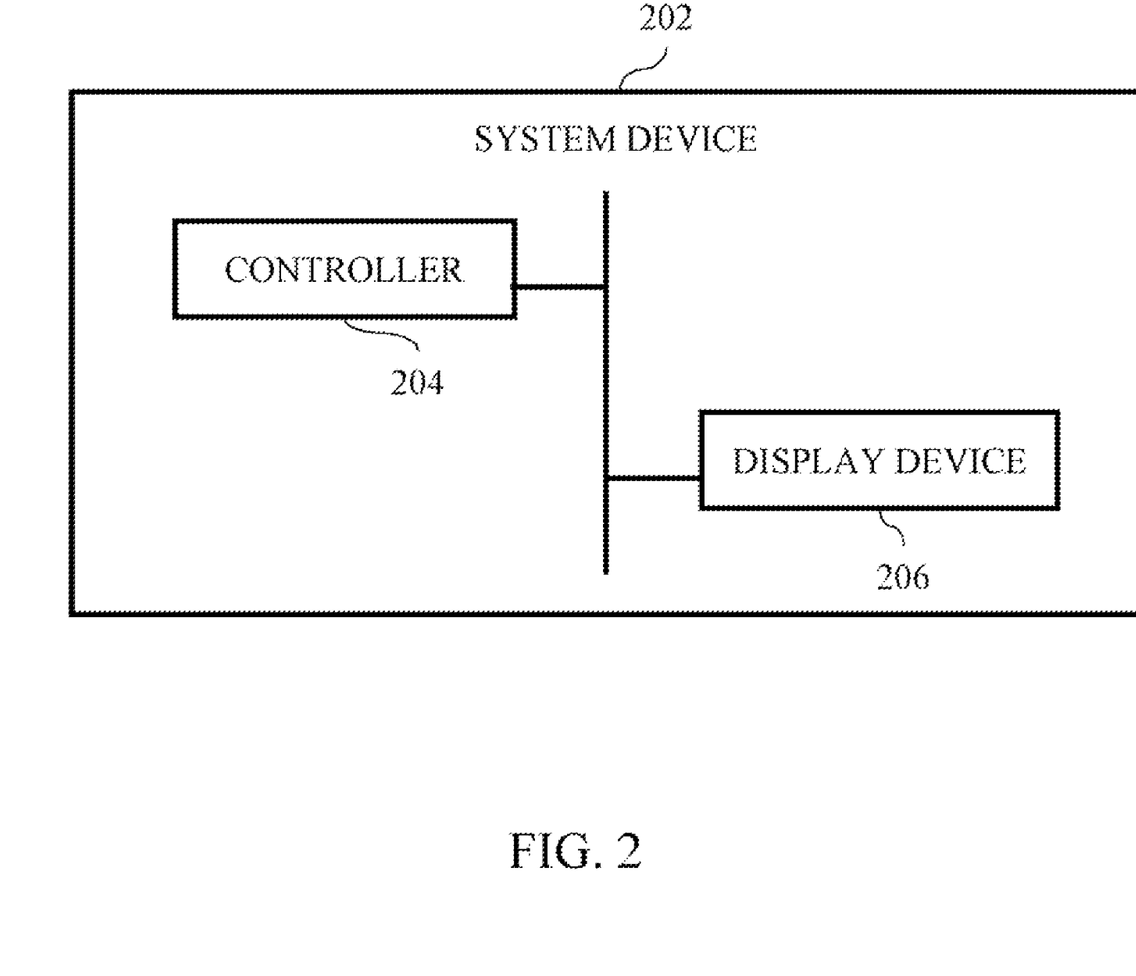
FIG. 2 is a block diagram illustrating a system for visualizing propagation, in accordance with an embodiment of the present invention.

FIG. 2 is a block diagram illustrating a system for visualizing the propagation of the RF signal, in accordance with some embodiments of the present invention. The system includes a system device 202, a controller 204 and a display device 206. Those skilled in the art will appreciate that the system device 202 may include all, additional or fewer components than those shown in FIG. 2. While describing the various elements of FIG. 2, multiple references to FIG. 1 may be made, but it should be understood that the invention can be implemented in any environment, whether it has all the elements or fewer elements than those shown in FIG. 1. For one embodiment, the system device 202 can be a part of the wireless devices or any device present in the communication network 100 that is connected to the wireless devices. Each of the wireless devices can have at least one system device 202 connected to them. The system device 202 is responsible for visualizing the propagation of the RF signal between the pluralities of wireless devices, and visualizes the RF signal incrementally along its propagation path. The system device 202 also enables users to view the propagation path of the RF signal between the wireless devices.

The controller 204 is configured to control the segmentation of the RF signal along its propagation path. The segmentation of the RF signal is a visual segmentation and the signal is not broken physically. The segmentation of the propagation path enables the user to be aware of any change or variation in the RF signal when it is propagated from the second wireless device 104 to the first wireless device 102, for example. For one embodiment, the controller 204 compares the one or more characteristics associated with the propagation of the RF signal with predefined criteria. These predefined criteria can be customized for each user of the system device 202. For example, a predefined criterion can be any change in the value of the characteristic during the propagation of the RF signal. Based on the comparison, the controller 204 detects each point by the change in the one or more of the characteristics associated with the propagation of the RF signal. Examples of the characteristics associated with the propagation of the RF signal can include, but are not limited to, the received signal strength indication (RSSI), the peak data rate, the signal to interference ratio (SIR), the signal to noise ratio (SNR), the signal to interference plus noise ratio (SINR), the bandwidth, the channel for propagation, service counts (handoff regions), distance losses, path losses, and interference. After detecting each point of change along the propagation path of the RF signal, the controller 204 segments the RF signal at each point of change. The segmentation is carried out incrementally along the propagation path of the RF signal and each segment has a uniform characteristic through out its length. The segments are also visualized by the display device 206 so that the user can easily gauge the value of the characteristics of each of the segments.

The display device 206 is configured to visualize and display the RF signal that is propagated between the second wireless device 104 and the first wireless device 102, for example. The display device 206 depicts the propagation path of the RF signal by using one or more connectors. These connectors help in representing the propagation path of the RF signal between two locations. The connectors also provide information about the characteristics associated with the propagation of the RF signal and the direction in which the RF signal is being propagated. Examples of the connectors can include, but are not limited to, different shapes, lines, symbols, bubbles, clouds, and Fresnel zones. The display device 206 enables the user to select one or more of the available connectors to depict the propagation path between devices such as the first wireless device 102 and the second wireless device 104. For example, the user can select a line or any other connector available with the system device 202 to represent the propagation path of the RF signal. The connectors can be represented by a two-dimensional (2D), three-dimensional (3D), or N-dimensional (ND) representation. The display device 206 also enables the user to select at least one of the two-dimensional (2D), three-dimensional (3D) or the N-dimensional (ND) representations. Once the controller 204 segments the RF signal along its propagation path, the display device 206 depicts each segment by using the connector. The display device 206 enables the user to select the connector to depict different segments. The user can either select a single connector with distinct visualization or different connectors to depict different segments. For example, the segments corresponding to the different values can be represented either by using a single connector of a different color, or different connectors to depict different segments. Further, the identical segments, i.e., segments with the same value, can be depicted by identical visual representation.

For one embodiment, the display device 206 can represent the direction of the propagation of the RF signal by visualizing the connectors. For example, the connectors can be represented by using an arrow pointing toward the direction of travel by varying the size or shape of the connector to represent the direction of travel, by using different colors or line types to represent the origin and end point of the propagation of the RF signal, and other different visual representations to represent the direction of travel. The display device 206 can depict the propagation path of the RF as a unidirectional, bi-directional or multi-directional representation.

The display device 206 is also configured to visualize the segments by using graphical representations. The display device 206 assigns a unique graphical representation to depict segments that show a change in at least one of the characteristics associated with the propagation of the RF signal. The display device 206 assigns identical graphical representation of segments with identical characteristics. Examples of such graphical representation can include, but are not limited to, different colors, shades, thickness, styles and line types.

For one embodiment, the display device 206 is provided with a memory module (not shown in FIG. 2). This memory module is configured to store a user's preferred style of connectors and other visual representations to display the propagation of the RF signal. The memory module stores information related to different users and enables them to use their own style to visualize the propagation of the RF signal. Thus, users do not need to select connectors and other visual representations each time they use the system device 202.

Figure 3:
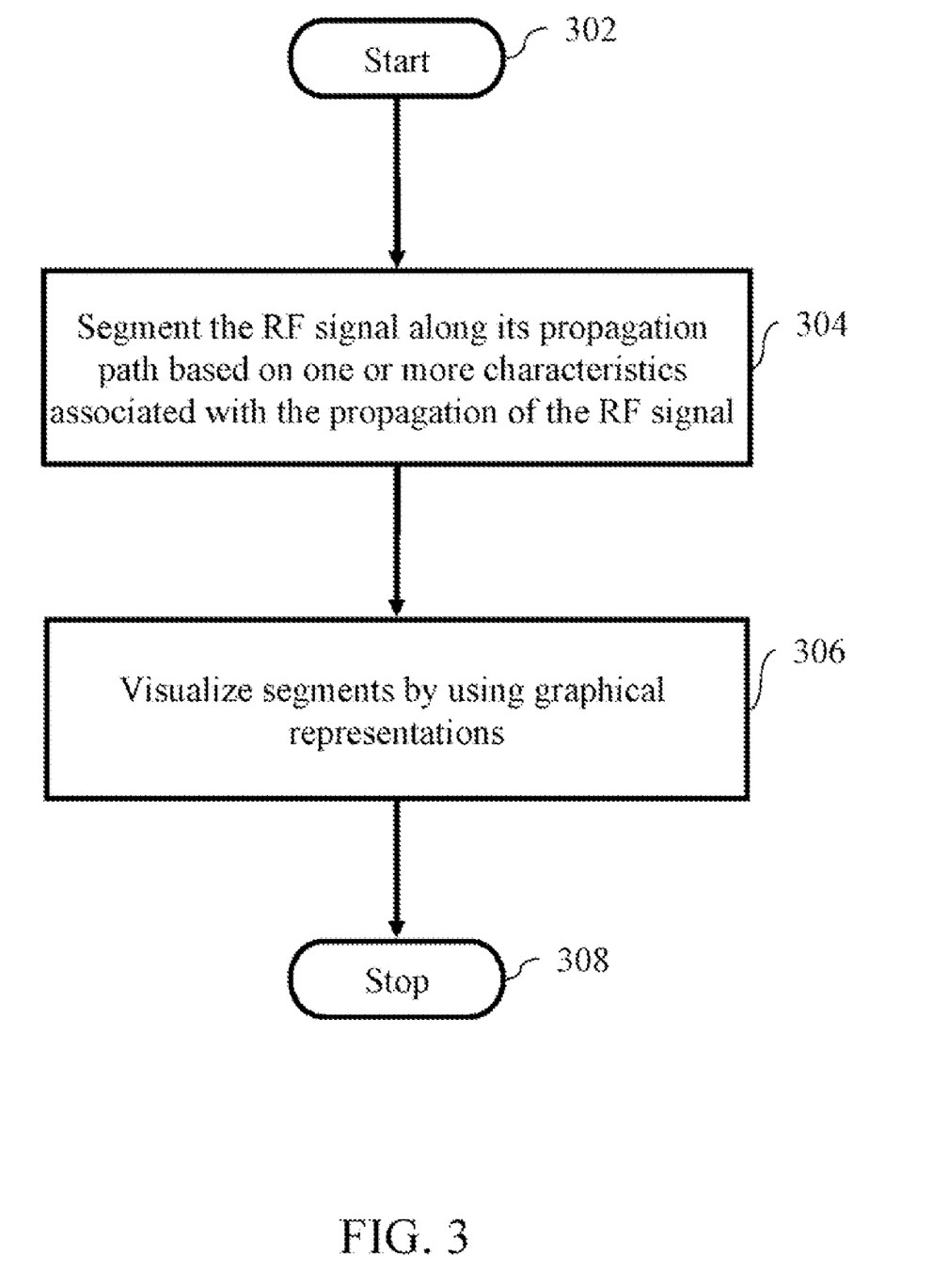
FIG. 3 is a flow diagram illustrating a method for visualizing the propagation of the RF signal, in accordance with an embodiment of the present invention.

FIG. 3 is a flow diagram illustrating a method for visualizing the propagation of the RF signal, in accordance with an embodiment of the present invention. Although the method has been described by using the following steps, it will be apparent to a person skilled in the art that it could include more or fewer steps. The method for visualizing the propagation of the RF signal between a first wireless device 102 and a second wireless device 104, for example, initiates at step 302. Herein, the second wireless device 104 transmits the signal to the first wireless device 102. At step 304, the controller 204 segments the RF signal along its propagation path, based on one or more characteristics associated with the propagation of the RF signal. At step 306, the display device 206 visualizes the segments by using graphical representations. The method for visualizing the propagation of the RF signal between a first wireless device 102 and a second wireless device 104 ends at step 306.

Figure 4:
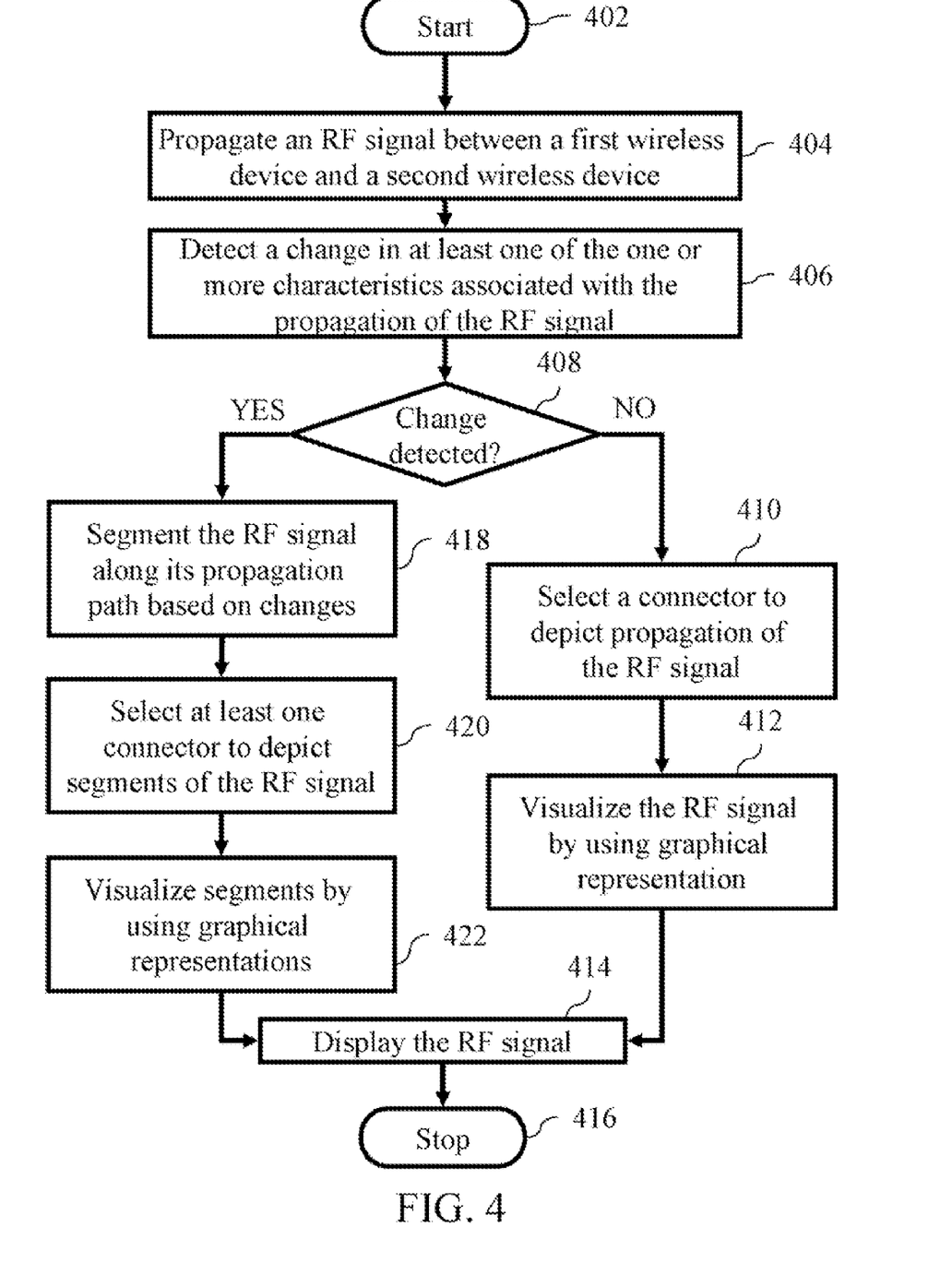
FIG. 4 is a flow diagram illustrating another method for visualizing the propagation of the RF signal, in accordance with an embodiment of the present invention

FIG. 4 is a flow diagram illustrating another method for visualizing the propagation of the RF signal, in accordance with an embodiment of the present invention. Although the method has been described by using the following steps, it should be apparent to a person skilled in the art that it could include more or fewer steps. The method for visualizing the propagation of the RF signal between a first wireless device 102 and a second wireless device 104, for example, initiates at step 402. At step 404, the RF signal is propagated between the first wireless device 102 and the second wireless device 104. The first wireless device 102 receives the RF signal propagated from the second wireless device 104. At step 406, the controller 204 detects each point of change along the propagation path of the RF signal. For one embodiment, the controller 204 detects each point of change, based on at least one of the one or more characteristics associated with the propagation of the RF signal along the propagation path of the RF signal. At step 408, the controller 204 verifies whether any change has been detected along the length of the propagation of the RF signal. If the controller 204 did not detect any change along the propagation path of the RF signal at step 408, the display device 206 selects a connector to depict the propagation path of the RF signal between the first wireless device 102 and the second wireless device 104 at step 410. After the connector is selected, the display device 206 visualizes the connector by using a graphical representation at step 412. This graphical representation is selected to represent the characteristic associated with the propagation of the RF signal. For example, an RSSI of the RF signal is divided into three categories—low, medium and high—and then different graphical representations, for example, different colors, are assigned for each category. The display device 206 visualizes the RF signal with one of the colors, depending on whether it has a low, medium or high RSSI value. After visualizing the connector with the graphical representation, the display device 206 displays the propagation path of the RF signal at step 414. The propagation path is displayed with all the assigned visual and graphical representations. Since there is no segment along the path of the propagation, the RF signal is displayed by using a connector and a graphical representation.

For another embodiment, the controller 204 detects each point of change, based on a mathematical model, along the propagation path of the RF signal at step 406. The controller 204 detects each point of change in the visualization of the RF signal, based on the mathematical model. In this embodiment, the segments are created, based on the results of the mathematical model, and each segment is not necessarily graphically aligned with the environment. Let us consider two cases, to explain this aspect of the invention clearly. In the first case, the first wireless device 102 is in the Line of Sight (LoS) of the second wireless device 104. The formula for calculating the distance loss for the LoS uses a factor of X. Further, in this case, the visualization of each segment (by using different colors) along the propagation of the RF signal matches the actual RF signal. Each of the segments along the propagation of the RF signal is aligned with the environment. The propagation path is in effect a graph of the actual RF signal at each segment, i.e., a segment is created along the propagation path of the RF signal whenever the change in the environment is detected. In the second case, there is No Line of Sight (NLoS) between the first wireless device 102 and the second wireless device 104, for example, the NLoS is caused due to a building present between the propagation path of the RF signal. The formula for calculating the distance loss for NLoS uses a factor Y, wherein the factor Y is greater than the factor X. The factor, in this case, changes to model the extra cost of going around, over, or through any number of buildings present within the propagation path of the RF signal. The visualization of the segments in this case is different from the first case in terms of the alignment of the segments with respect to the environment. The segments are not necessarily graphically aligned with the environment. The propagation path is in effect a graph of the mathematical model simulation of the RF signal at each segment, i.e., the segment is created along the propagation path of the RF signal whenever the change in the mathematical model simulation is detected. The propagation path does not match the actual RF signal when it is traced along the line of propagation. However, the final value of the RF signal received at the first wireless device 102 matches the actual RF signal value of the first wireless device 104.

For one embodiment, if the controller 204 detects at least one change along the propagation path of the RF signal at step 408, the controller 204 segments the RF signal along its propagation path for each point of change in at least one of the one or more characteristics associated with the propagation of the RF signal at step 418. At step 420, the display device 206 selects at least one connector to depict each segment along the propagation path of the RF signal between the first wireless device 102 and the second wireless device 104. After the connector is selected, the display device 206 visualizes the segments by using graphical representations at step 422. The display device 206 assigns a unique graphical representation to depict the segments with a change in at least one of the one or more characteristics associated with the propagation of the RF signal. For example, the segments are created, based on an RSSI associated with the RF signal. Let us assume that if the RSSI for an RF signal propagating from one location to another changes three times during its propagation, a unique graphical representation, for example, different line types, can be assigned for each segment with a different RSSI value. At step 414, the display device 206 displays the propagation of the RF signal with all the assigned visual and graphical representations. The visualization enables the user to know about the changes that occurred during the propagation of the RF signal without altering the positions of the first wireless device 102 and the second wireless device 104. For one embodiment, the display device 206 depicts the causes for the changes that occurred during the propagation of the RF signal. In other words, whenever an environment changes during the propagation of the RF signal, there is the change in the characteristics associated with the RF signal. Further, each of the segments along the propagation path of the RF signal is aligned with the environment. The environment can be changed by any obstruction, path losses, interference caused by other RF signals, the distance between the two locations, and other causes known in the art.

The display device 206 can visualize the propagation of the RF signal in real time. The display device 206 also displays at least one of a plurality of RF signals transmitted between the plurality of wireless devices when the at least one RF signal is successfully received at either of first wireless device 102 or the second wireless device 104, for example. This aspect of the present invention is explained in detail while describing FIG. 6. For one embodiment, the display device 206 also identifies undefined segments in the path of RF signal propagation. The cause for the change in at least one of the one or more characteristics associated with the propagation of the RF signal is unknown in the undefined segment. For the undefined segments, the causes for the change in the characteristics associated with the propagation of the RF signal cannot be predicted by using propagation models. For example, when the RF signal travels from one side of the building to another, it cannot be predicted if the RF signal has gone around, over or through it. Further, the changes in the characteristics along the propagation path cannot be predicted while the RF signal is being propagated from the undefined segment. The display device 206 uses distinct visualization for the undefined segments. On the basis of the visualization, the user can easily determine whether or not a segment is the undefined segment. The method for visualizing the propagation of the RF signal between a first wireless device 102 and a second wireless device 104 ends at step 416.

For one embodiment, the present invention can be used to depict characteristics other than those used to segment the RF signal. For clarity, let us assume that the controller 204 detects each point of change, based on at least one of the one or more characteristics associated with the propagation of the RF signal along the propagation path of the RF signal. The controller 204 segments the RF signal along its propagation path at each point of change. After the process of segmentation is completed, the display device 206 displays the segment to represent a different characteristic from at least one of the one or more characteristics used to segment the RF signal. This aspect can help users to choose a characteristic to segment the RF signal and determine the value associated with the segment for a different characteristic. For example, the controller 204 segments the RF signal, based on the Signal-to-Noise Ratio (SNR) associated with its propagation, and the display device 206 visualizes each segment to provide information about another characteristic, for example, the data rate, for each of the segments.

Figure 5:
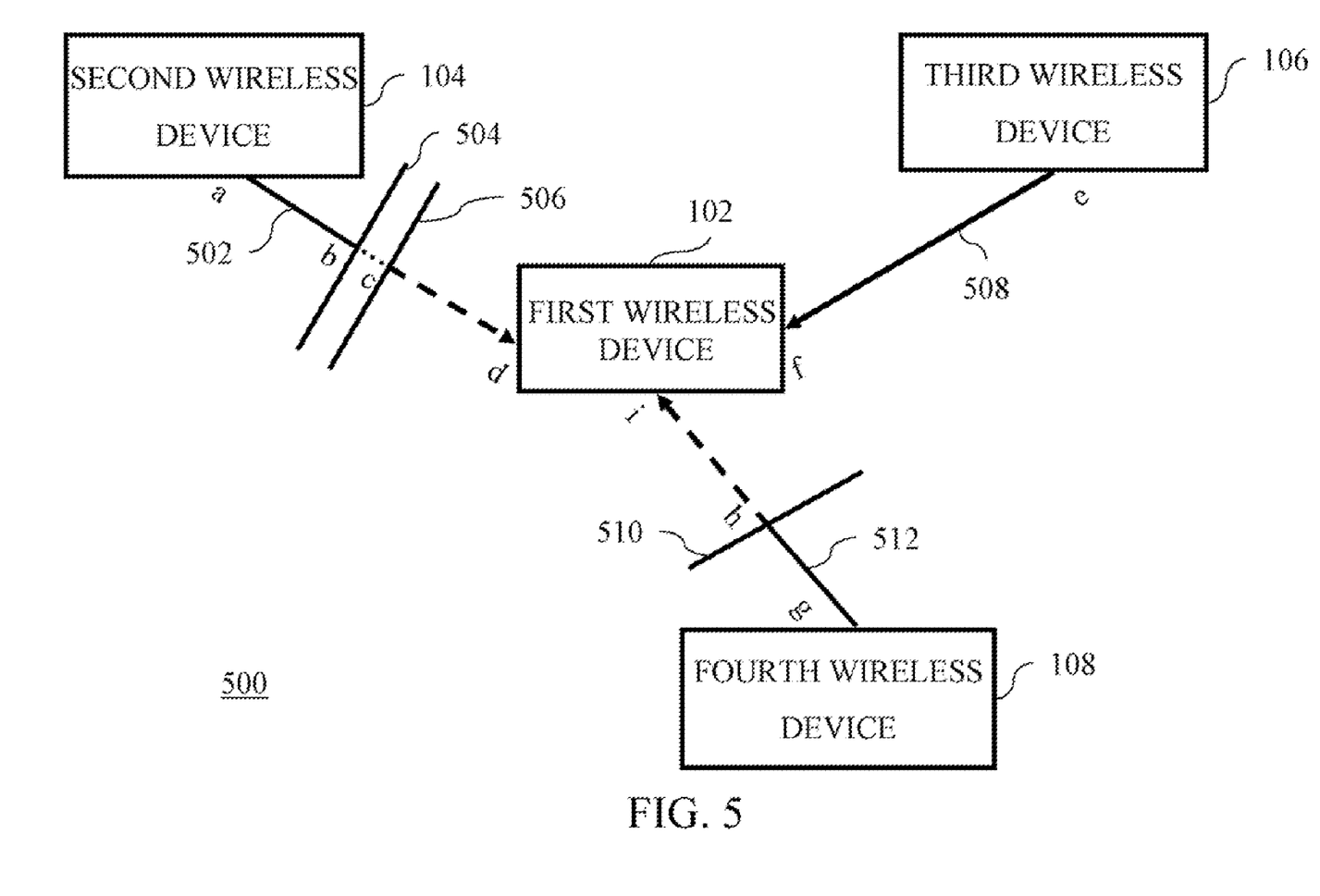
FIG. 5 is a setup illustrating the visualization of segments along the propagation path, in accordance with an embodiment of the present invention.

FIG. 5 is a setup 500 illustrating the visualization of the segments along the propagation path, in accordance with an embodiment of the present invention. For clarity, the setup 500 has been described by using only one characteristic associated with the propagation of the RF signal, based on which the controller 204 segments the RF signal. Let us assume that the segments are created, based on the RSSI value associated with the RF signal. However, more than one characteristic can be used to segment the RF signal along its propagation path. For one embodiment, the first wireless device 102 receives the RF signal from the second wireless device 104, the third wireless device 106, and the fourth wireless device 108. For clarity, the setup 500 has been described by using a different line type to visualize a segment, based on the change in the characteristic associated with the propagation of the RF signal. However, it will be apparent to a person ordinarily skilled in the art that the setup 500 can include various other graphical representations to visualize different segments.

For one embodiment, the second wireless device 104 transmits an RF signal 502 to the first wireless device 102. The elements 504 and 506 act as an obstruction in the propagation path of the RF signal 502 and cause the characteristic (RSSI value) associated with the RF signal 502 to change. The propagation path for the RF signal 502 is divided into three segments, a-b, b-c, and c-d, associated with the elements 504 and 506. Each of the segments is created due to the change in the RSSI value on the propagation path of the RF signal 502. Further, each of the segments is graphically aligned with the environment, i.e., they are graphically aligned with the elements and cause the RSSI values to change. The segment a-b, shown by a thick line, corresponds to the RF signal 502 with a high RSSI value. As the RF signal propagates in the direction of an arrow, i.e., from point a to d, its path is obstructed by the element 504 at point b. On encountering the element 504 in its propagation path, the RF signal 502 undergoes a change in its RSSI value. The RSSI value associated with the RF signal 502 decreases, as compared to the original RSSI value (at point a) of the RF signal 502. The segment b-c, shown by a dotted line, corresponds to the RF signal 502 with an RSSI value that is less than that of the segment a-b. On further propagation from point b to d, the RF signal 502 encounters another element 506 that also obstructs its propagation path. The RSSI value associated with the RF signal 502 further decreases as compared to the RSSI value of the previous segment, i.e., b-c. The segment c-d, shown by a broken line, corresponds to the RF signal 502 with an RSSI value that is less than that of the segment b-c. The c-d segment corresponds to the final RSSI value of the RF signal 502 received at the first wireless device 102.

For one embodiment, the third wireless device 106 transmits an RF signal 508 to the first wireless device 102. The RF signal 508 propagates in the direction of an arrow, i.e., from point e to f. The propagation path of the RF signal 508 is free from any obstruction. Therefore, the original RSSI value associated with the RF signal 508 (when transmitted from the third wireless device 106) is the same as the final RSSI value received at the first wireless device 102. There is no change in the RSSI value along the propagation path, resulting in only one segment e-f, which is depicted by a thick line throughout its length.

For one embodiment, the fourth wireless device 108 transmits an RF signal 512 to the first wireless device 102. An element 510, acting as an obstruction in the propagation path of the RF signal 512, causes the characteristic (RSSI value) associated with the RF signal 512 to change. When the RF signal 512 propagates in the direction of an arrow, i.e., from point g to i, its path is obstructed by the element 504 at point h. The visual representation of the segments g-h and h-i differs due to the element 510. The segment g-h has a similar representation as that of the segments a-b and e-f, since they all correspond to a particular RSSI value. Further, the RSSI value of the segment h-i has a representation that is similar to that of the segment c-d, since both these segments share the same RSSI value.

Figure 6:
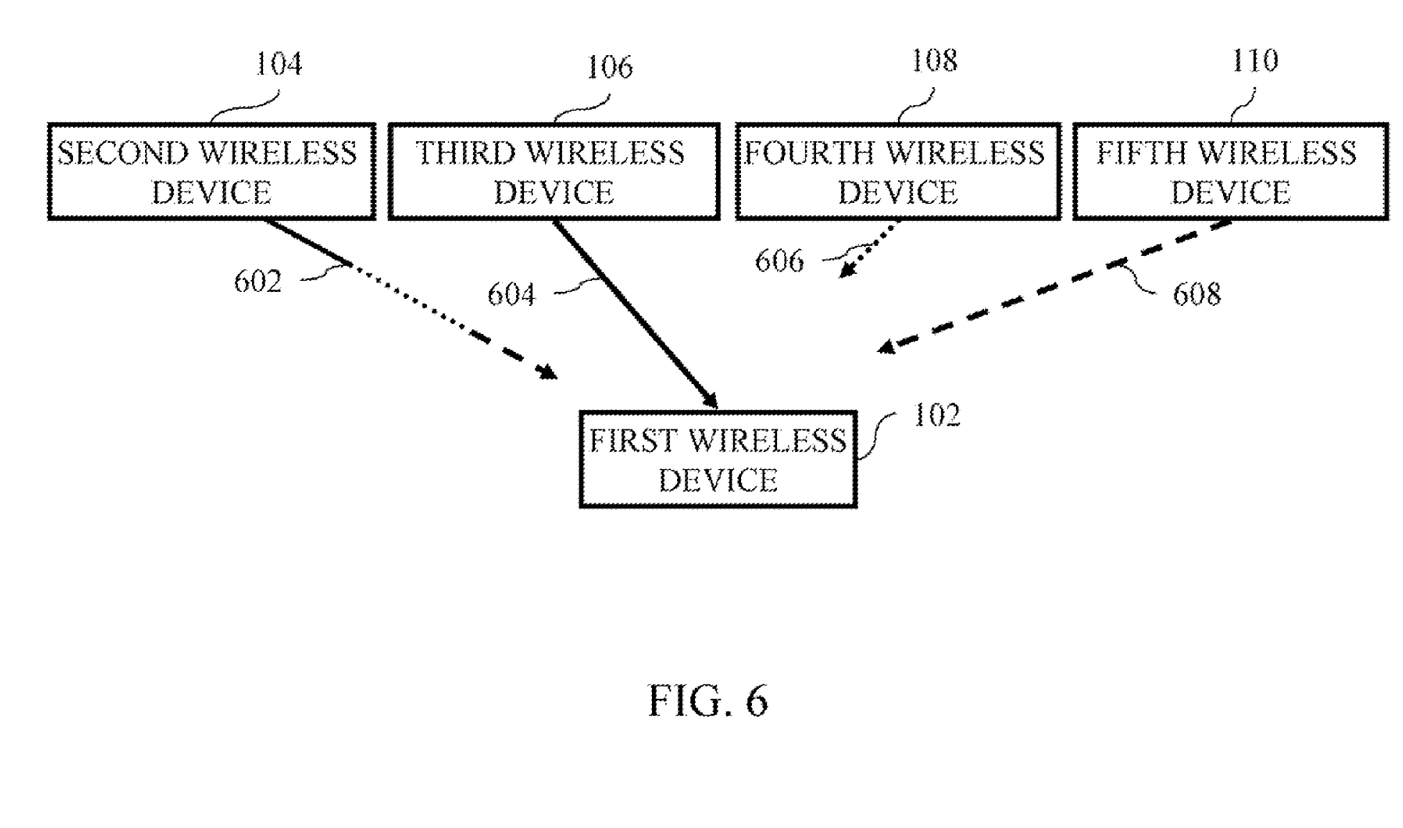
FIG. 6 is a setup illustrating a successfully received RF signal at the first wireless device, in accordance with an embodiment of the present invention.

FIG. 6 is a setup illustrating a successfully received RF signal at the first wireless device 102, for example, in accordance with an embodiment of the present invention. For one embodiment, each of the plurality of the second wireless device 104, the third wireless device 106, the fourth wireless device 108, and the fifth wireless device 110 transmits an RF signal to the first wireless device 102. A plurality of RF signals 602-608 is transmitted from each of the plurality of the wireless devices 104-110 to the first wireless device 102. The display device 206 displays the complete propagation path of the successfully received RF signals at the first wireless device 102. Successfully received RF signals are those signals that are able to reach the first wireless device 102. The RF signal 604, transmitted from the third wireless device 106, successfully reaches the first wireless device 102. The RF signals 602, 606 and 608, propagating from the second wireless device 104, the fourth wireless device 108 and the fifth wireless device 110, respectively, terminates before reaching the first wireless device 102. The termination point of the RF signals 602, 606 and 608 depicts the maximum limit of the propagation of the RF signal. This aspect of the present invention will help the user to easily identify all the signals that are successfully received at the first wireless device 102, and to determine at which point the remaining signals will terminate.

Figure 7:
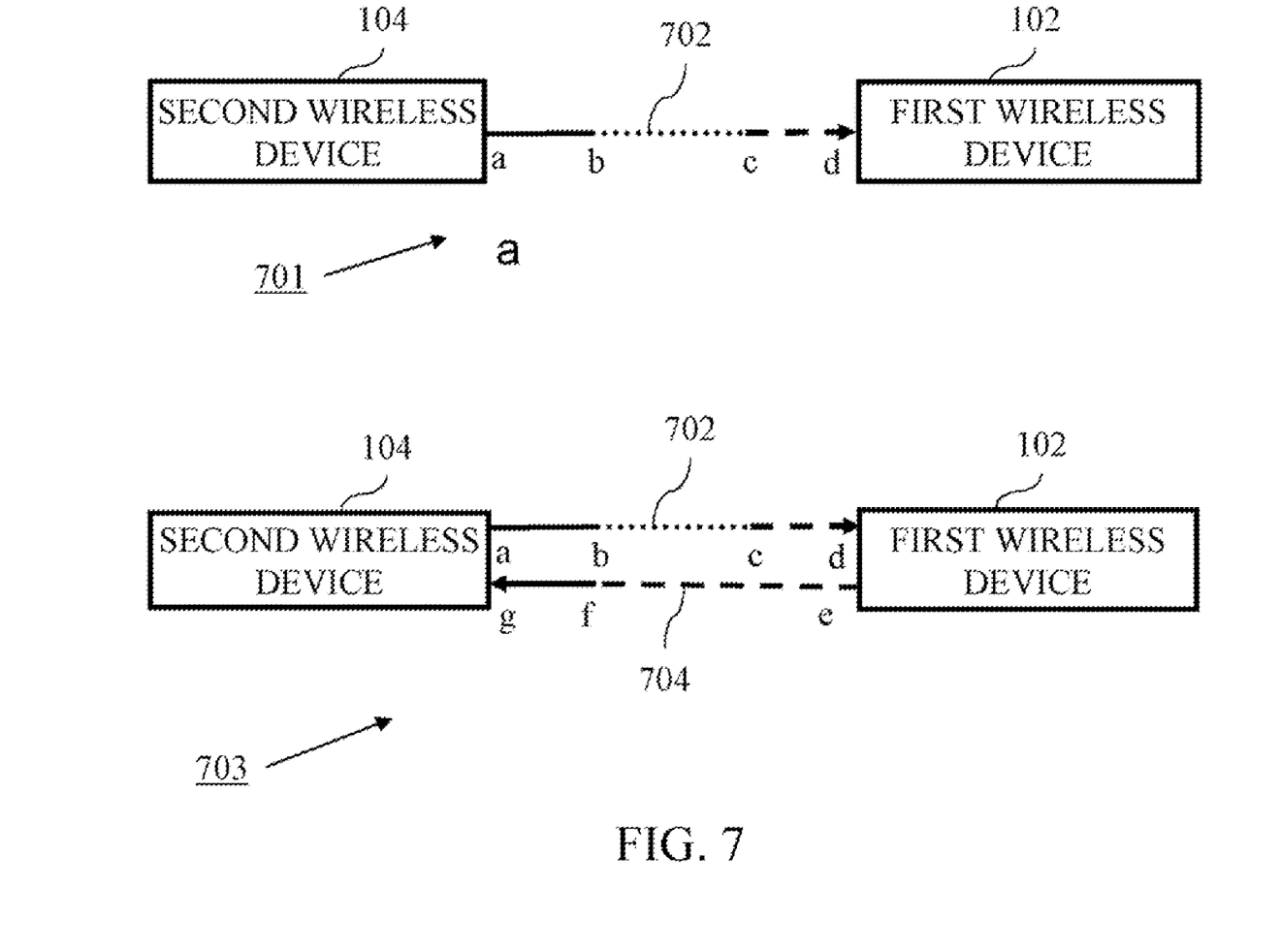
FIG. 7 is a setup illustrating reverse linking and other losses associated with the propagation of the RF signal, in accordance with an embodiment of the present invention.

FIG. 7 is a setup illustrating reverse linking and other losses associated with the propagation of the RF signal, in accordance with an embodiment of the present invention. The present invention can be used to visualize the propagation of the RF signal by using unidirectional, bi-directional or multi-directional representation. For clarity, the present invention is described by using bi-directional representation to indicate the visualization of the RF signal along the two directions, wherein one direction is propagating from the second wireless device 104 to the first wireless device 102, and the other direction is propagation from the first wireless device 102 to the second wireless device 104. For one embodiment, the setup 701 shows that the first wireless device 102 receiving an RF signal 702 that is propagated from the second wireless device 104. The RF signal 702 is divided into three segments, a-b, b-c and c-d. Each of the three segments corresponds to different characteristics associated with the propagation of the RF signal 702. The change in the characteristics, as shown in the setup 701, is caused by distance dependent losses or other RF type losses, for example, interference, etc. For an embodiment of the present invention, the visualization of the propagation of the RF signal can be used to depict reverse linking of the RF signal. The setup 703 explains the reverse linking of the RF signal 702. In other words, the RF signal 704 can be displayed as it is being propagated from the first wireless device 102 to the second wireless device 104, in addition to its actual propagation path, i.e., from the second wireless device 104 to the first wireless device 102. The segments and their visual representation can change during the propagation of the RF signal 702 in the reverse direction. As shown in FIG. 7, the segments in the propagation path of the RF signal 704 differ from those of the RF signal 702.

Various embodiments of the present invention have significant advantages. The present invention provides a method and system to visualize the propagation of a radio-frequency (RF) signal between a first wireless device and a second wireless device. For an embodiment of the present invention, the RF is visualized along its propagation path incrementally, whenever a change in one or more of the characteristics associated with the propagation of the RF signal is detected. In another embodiment of the present invention, users can easily identify undefined segments along the propagation path of the RF signal. In yet another embodiment of the present invention, the user can see the unidirectional, bi-directional or multi-directional visual representation of the propagation path of the RF signal. In yet another embodiment of the present invention, the propagation of the RF signal is visualized on the display device without the positions of the first wireless device and the second wireless device being altered.

It should be appreciated that the method and system for visualizing the propagation of a radio-frequency (RF) signal between a first wireless device and a second wireless device may comprise one or more conventional controllers and unique stored program instructions that control the one or more controllers, to implement, in conjunction with certain non-processor circuits, some, most, or all of the functions of the system described herein. The non-processor circuits may include, but are not limited to, signal drivers, clock circuits, power source circuits, and user input devices. As such, these functions may be interpreted as steps of a method for visualizing the propagation of a radio-frequency (RF) signal between a first wireless device and a second wireless device. Alternatively, some or all the functions can be implemented by a state machine that has no stored program instructions, or in one or more application-specific integrated circuits (ASICs), in which each function, or some combinations of certain of the functions, are implemented as custom logic. Of course, a combination of the two approaches can also be used. Thus, methods and means for these functions have been described herein.

It is expected that one with ordinary skill, notwithstanding possibly significant effort and many design choices motivated by, for example, available time, current technology and economic considerations, when guided by the concepts and principles disclosed herein, will be readily capable of generating such software instructions, programs and ICs with minimal experimentation.

In the foregoing specification, specific embodiments of the present invention have been described. However, one with ordinary skill in the art will appreciate that various modifications and changes can be made without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of the claims, as issued.

The Abstract of the Disclosure is provided to enable the reader to quickly ascertain the nature of the technical disclosure. It is submitted with the understanding that it will not be used to interpret or limit the scope or meaning of the claims. In addition, it is evident in the foregoing Detailed Description that various features are grouped together in a single embodiment to streamline the disclosure. This method of disclosure should not be interpreted as an intention that the claimed embodiments require more features than are expressly recited in each claim. As the following claims indicate, the inventive subject matter is not a part of all the features of a single disclosed embodiment. Thus, the following claims are hereby incorporated into the Detailed Description, with each claim standing on its own as a separately claimed subject matter.

What is claimed is:

1. A method for visualizing propagation of a radio-frequency (RF) signal between a first wireless device and a second wireless device, the method comprising:
    segmenting, by a controller, the RF signal along its propagation path based on one or more characteristics associated with the propagation of the RF signal;
    visualizing, by a display device, the segments by using graphical representations; and
        identifying undefined segments in the path of RF signal propagation, wherein a reason for change in at least one of the one or more characteristics associated with the propagation of the RF signal is unknown in the undefined segment.

2. The method as recited in claim 1, wherein segmenting the RF signal comprises detecting each point of change in at least one of the one or more characteristics associated with the propagation of the RF signal.

3. The method as recited in claim 1 further comprising depicting each segment by using one or more connectors taken from a group consisting different shapes, lines, symbols, bubbles, clouds, and fresnel zones.

4. The method as recited in claim 3 further comprising depicting the connectors by using one or more from a group consisting a two-dimensional, a three-dimensional, and a N-dimensional representation.

5. The method as recited in claim 1, wherein visualizing the segments by using graphical representations comprises assigning a unique graphical representation to depict the segments with a change in at least one of the one or more characteristics associated with the propagation of the RF signal.

6. The method as recited in claim 1, wherein visualizing the segments by using graphical representations comprises assigning the graphical representations by using one or more from a group consisting different colors, shades, thickness, styles, and line types.

7. The method as recited in claim 1 further comprising visualizing propagation of the RF signal by using at least one of a unidirectional, a bi-directional, and a multi-directional representation.

8. The method as recited in claim 1 further comprising depicting the causes for a change in at least one of the one or more characteristics associated with the propagation of the RF signal.

9. The method as recited in claim 1 further comprising visualizing propagation of the RF signal on a display device in real time.

10. The method as recited in claim 1 further comprising displaying at least one of a plurality of RF signals between a plurality of wireless devices when the at least one RF signal is successfully received at least one of the first wireless device and the second wireless device.

11. The method as recited in claim 1 further comprising displaying a segment to represent a different characteristic than at least one of the one or more characteristics considered for segmenting the RF signal.

12. The method as recited in claim 1 further comprising visualizing propagation of the RF signal on a display device without altering the positions of the first wireless device and the second wireless device.

13. A method for visualizing propagation of a radio-frequency (RF) signal between a first wireless device and a second wireless device, the method comprising:
    segmenting, by a controller, the visualization of a mathematical model path of the RF signal when the RF signal is being transmitted from the second wireless device to the first wireless device, wherein segmenting the visualization of the mathematical model path comprises detecting each point of change in the RF signal based on the mathematical model; and
    visualizing, by a display device, the segments by using graphical representations.

14. A system for visualizing propagation of a radio-frequency (RF) signal between a first wireless device and a second wireless device, the system comprising:
    a controller being configured to segment the RF signal along its propagation path based on one or more characteristics associated with the propagation of the RF signal; and identifying undefined segments in the path of RF signal propagation, wherein a reason for change in at least one of the one or more characteristics associated with the propagation of the RF signal is unknown in the undefined segment; and
    a display device being configured to display the segments by using graphical representations.

15. The system as recited in claim 14, wherein the controller is further configured to detect each point of change in at least one of the one or more characteristics associated with the propagation of the RF signal.

16. The system as recited in claim 14, wherein the display device is further configured to depict each segment by using one or more connectors taken from a group consisting different shapes, lines, symbols, bubbles, clouds, and fresnel zones.

17. The system as recited in claim 16 is further configured to depict the connectors by using one or more from a group consisting a two-dimensional, a three-dimensional, and an N-dimensional representation.

18. The system as recited in claim 14, wherein the display device is further configured to assign a unique graphical representation to depict the segments with a change in at least one of the one or more characteristics associated with the propagation of the RF signal.

* * * * *